(12) United States Patent
Hou

(10) Patent No.: US 7,651,116 B2
(45) Date of Patent: Jan. 26, 2010

(54) BABY STROLLER FRAME

(75) Inventor: Hung-Chung Hou, Tai-Bau (TW)

(73) Assignee: Link Treasure Limited, Tortola (VG)

( * ) Notice: Subject to any disclaimer, the term of this patent is extended or adjusted under 35 U.S.C. 154(b) by 224 days.

(21) Appl. No.: 11/789,309

(22) Filed: Apr. 24, 2007

(65) Prior Publication Data
US 2007/0246916 A1    Oct. 25, 2007

(30) Foreign Application Priority Data
Apr. 25, 2006    (TW) ............................. 95206985 U

(51) Int. Cl.
*B62B 7/06* (2006.01)
(52) U.S. Cl. ...................... 280/642; 280/647
(58) Field of Classification Search .................. 280/642, 280/647, 650, 641
See application file for complete search history.

(56) References Cited

U.S. PATENT DOCUMENTS

| | | | |
|---|---|---|---|
| 5,460,399 A * | 10/1995 | Baechler et al. ............. | 280/650 |
| 5,772,235 A | 6/1998 | Espenshade ................. | 280/643 |
| 6,036,220 A * | 3/2000 | Zhen .......................... | 280/642 |
| 6,105,998 A * | 8/2000 | Baechler et al. ............. | 280/650 |
| 6,886,839 B2 * | 5/2005 | Everett ........................ | 280/62 |
| 7,267,359 B1 * | 9/2007 | Yang et al. .................. | 280/642 |
| 2006/0061066 A1 * | 3/2006 | Tan ............................. | 280/642 |
| 2007/0090628 A1 * | 4/2007 | Golias ........................ | 280/642 |
| 2007/0246916 A1 * | 10/2007 | Hou ............................ | 280/642 |
| 2008/0054601 A1 * | 3/2008 | Li .............................. | 280/642 |
| 2008/0061532 A1 * | 3/2008 | Chen .......................... | 280/642 |
| 2008/0061534 A1 * | 3/2008 | Chen .......................... | 280/647 |
| 2008/0211206 A1 * | 9/2008 | Thorne et al. ............... | 280/650 |
| 2009/0008907 A1 * | 1/2009 | Huang ........................ | 280/642 |
| 2009/0014985 A1 * | 1/2009 | Huang ........................ | 280/647 |

* cited by examiner

*Primary Examiner*—Jeffrey J Restifo
(74) *Attorney, Agent, or Firm*—Morris, Manning & Martin LLP; Tim Tingkang Xia

(57) ABSTRACT

A baby stroller frame comprises a front frame, a pair of rear leg tube, and a guiding frame. The front frame connects a front wheel. The pair of rear leg tube, each has an upper end pivotally connected with the front frame, a lower end connected a rear wheel, and a joint connected with a sliding sleeve. The guiding frame has a front end pivotally connected to the front frame, and a pair of connecting arms slidably connected with the sliding sleeve. By simply rotating of the guiding frame, the sliding sleeve would carry the pair of rear leg tubes to rotate and close to the front frame. As the structure of such a stroller frame is being simplified, it would much lower the manufacture cost of a baby stroller frame and provide a new and smooth operation for a user.

7 Claims, 6 Drawing Sheets

BABY STROLLER FRAME

BACKGROUND OF THE INVENTION

1. Field of the Invention

The present invention relates to a baby stroller frame and in particular, to a baby stroller frame having a guiding frame with one end pivotally connected with a pair of front leg tubes and a pair of connecting arms which is guided by a pair of sliding sleeves mounted on a pair of rear leg tubes of the baby stroller frame.

2. Description of the Related Art

A foldable baby stroller frame generally comprises a linkage system which can be folded from an erect position to a collapsed position. The folding can be actuated by a user's hand, so as to release a pair of joint members from a locked position. An example structure of the type of baby stroller frame can be found in U.S. Pat. No. 5,772,235.

However, the assembly process of the above-mentioned structure requires a troublesome amount of work. Further, when applying the structure in a dual seat baby stroller, the linkage system becomes complex and increases in size, which can lead to unexpected trouble in the folding operation of the stroller.

SUMMARY OF THE INVENTION

In order to resolve the above-mentioned problems, the present invention provides a stroller frame, which has a front frame, a guiding frame, and a pair of rear leg tubes.

The pair of rear leg tubes, each has an upper end pivotally connected with the front frame, a lower end connected at least a rear wheel, and mounted a sliding sleeve with a joint between the upper end and the lower end of the rear leg tube.

The front frame has a handle, a pair of push arms, a pair of front leg tubes and a connecting member.

The connecting member has a side joints for pivotally connecting with the pair of front leg tubes, a pair of support arms connected with at least a front wheel, a rear end joint pivotally connected with the front end of the guiding frame.

The guiding frame has a front end pivotally connected to the rear end joint, and a pair of connecting arms slidably connected with the sliding sleeve for guiding a rotation of the pair of rear leg tube between an erect position to a collapsed position.

As the structure of such a stroller frame being simplified, it would much lower the manufacture cost of a baby stroller frame and provide a new and smooth operation for a user.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
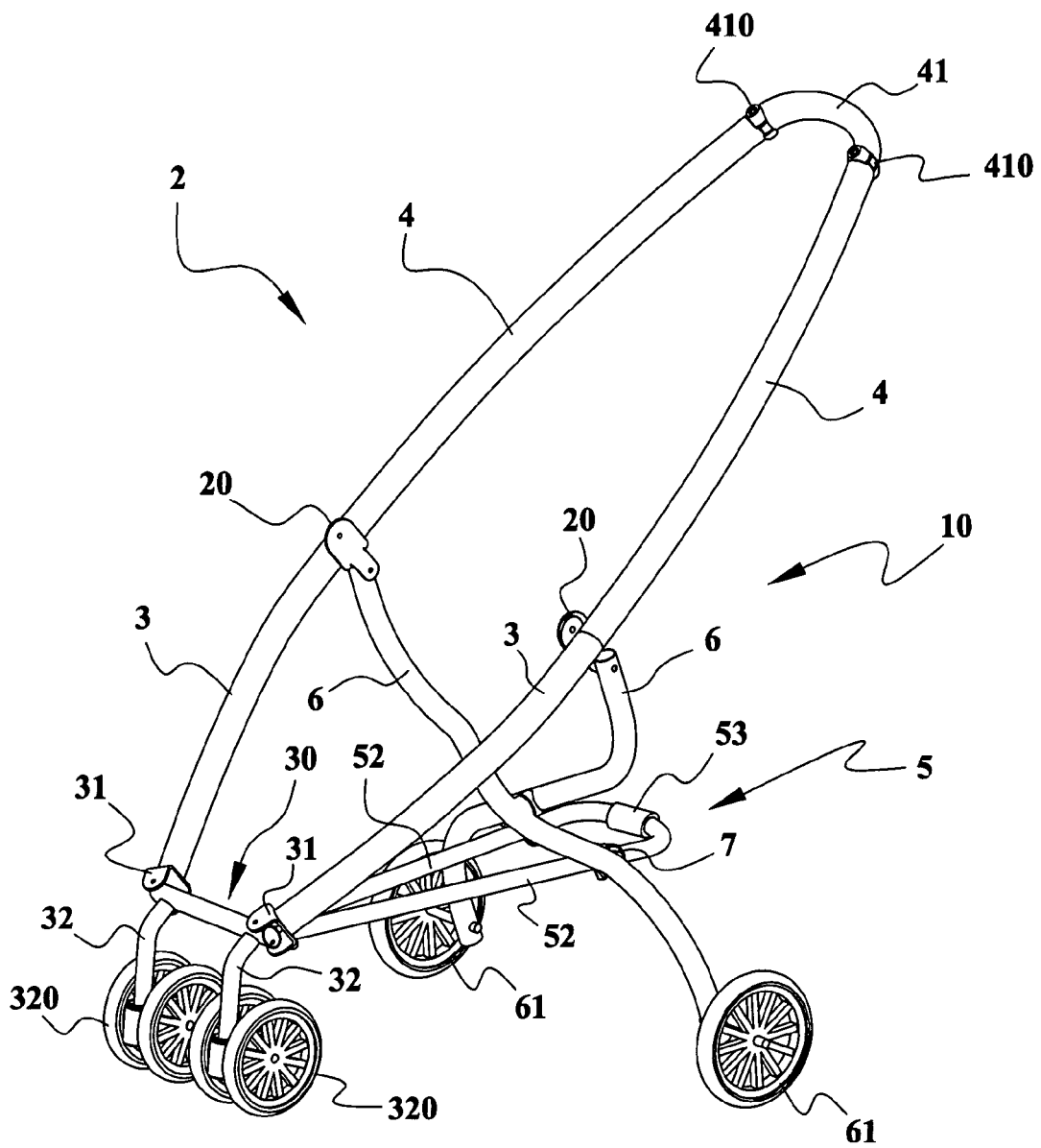
FIG. 1 is an front perspective view of an embodiment of the baby stroller frame according to the present invention.
Figure 2:
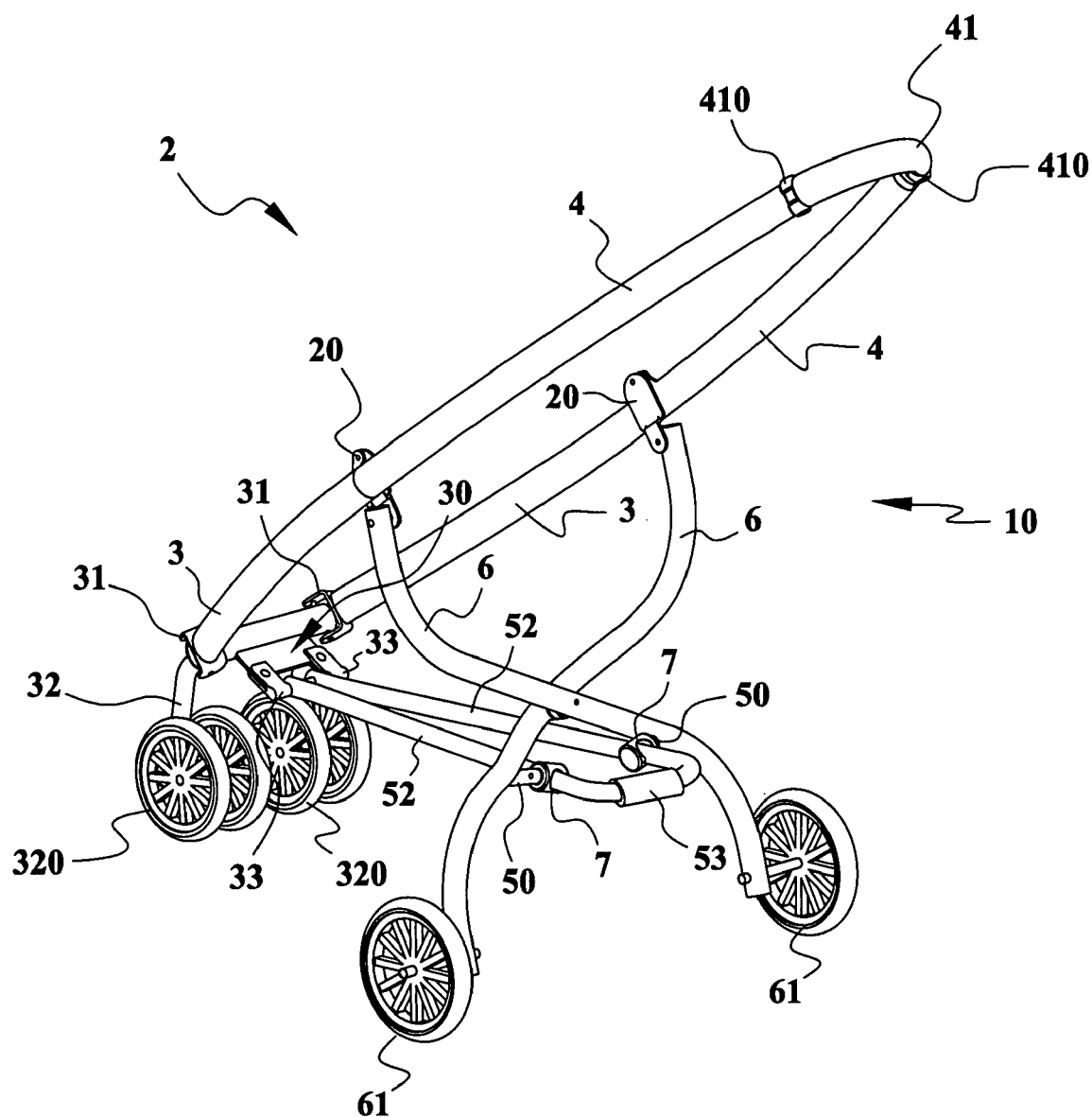
FIG. 2 is a rear perspective view of the baby stroller frame of FIG. 1.
Figure 3:
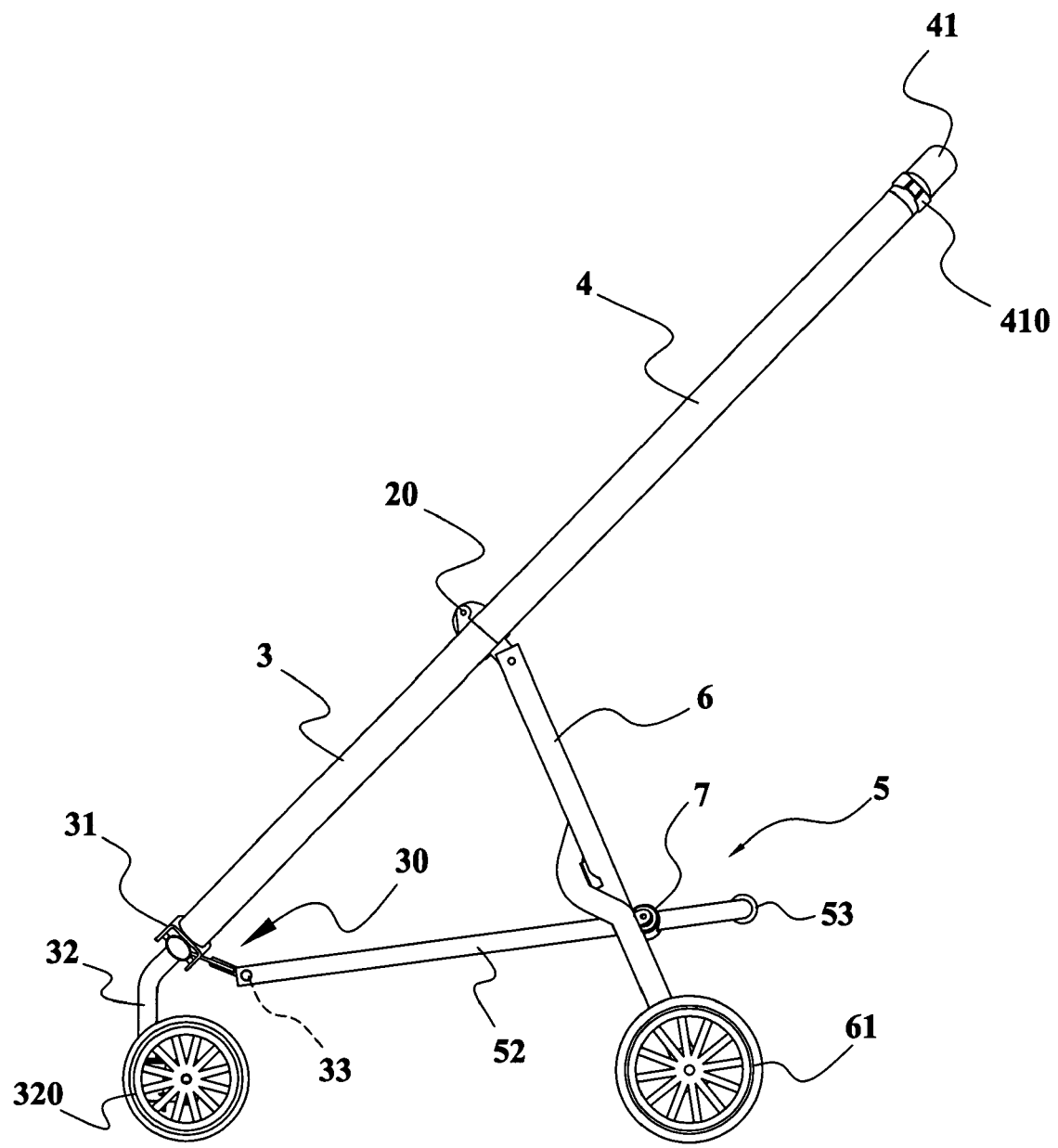
FIG. 3 is a side view of the baby stroller frame of FIG. 1.

Referring to FIGS. 1, 2 and 3, an embodiment of a stroller frame 10 according to the present invention has a front frame 2, a guiding frame 5, and a pair of rear leg tubes 6.

The pair of rear leg tubes 6, each has an upper end pivotally connected with the front frame 2, a lower end connected at least a rear wheel 61, and mounted a sliding sleeve 7 with a joint 50 between the upper end and the lower end of the rear leg tube 6.

The front frame 2 connects at least a to front wheel 320, and may have a handle 41, a pair of push arms 4, a pair of front leg tubes 3 and connecting member 30.

The pair of push arms 4, each has an upper end joint 410 and a lower end joint 20. The upper end joints 410 pivotally connected between the handle 41 and the pair of push arms 4, so as to allow the pair of push arms 4 to rotate and close to each other for reducing the width of the stroller frame 10.

The lower end joint 20 is pivotally connected between the pair of push arms 4 and the pair of front leg tubes 3, and preferably connects the upper end of the pair of rear leg tubes 6, so as to allow the pair of push arms 4, the pair of rear leg tubes 6 and the pair of front leg tubes 3 to relatively rotate and close to each other for further reducing the width of the stroller frame 10.

The connecting member 30 has a pair of side joints 31 for pivotally connecting with the pair of front leg tubes 3, a pair of support arms 32 connected with at least a front wheel 320, and a rear end joint 33 pivotally connected with the front end of the guiding frame 5.

The guiding frame 5 has a front end pivotally connected to the rear end joint 30, and a pair of connecting arms 52 slidably connected with the sliding sleeve 7 for guiding the rotation of the pair of rear leg tubes 6 between an erect position to a collapsed position.

The guiding frame 5 has rear end which is wider than the front end thereof, so as to guide the pair of rear leg tubes 6 close to each other when a user rotates the guiding frame 5 and makes the sliding sleeve 7 to slide along the pair of connecting arms 52 toward to front end thereof.

Figure 4:
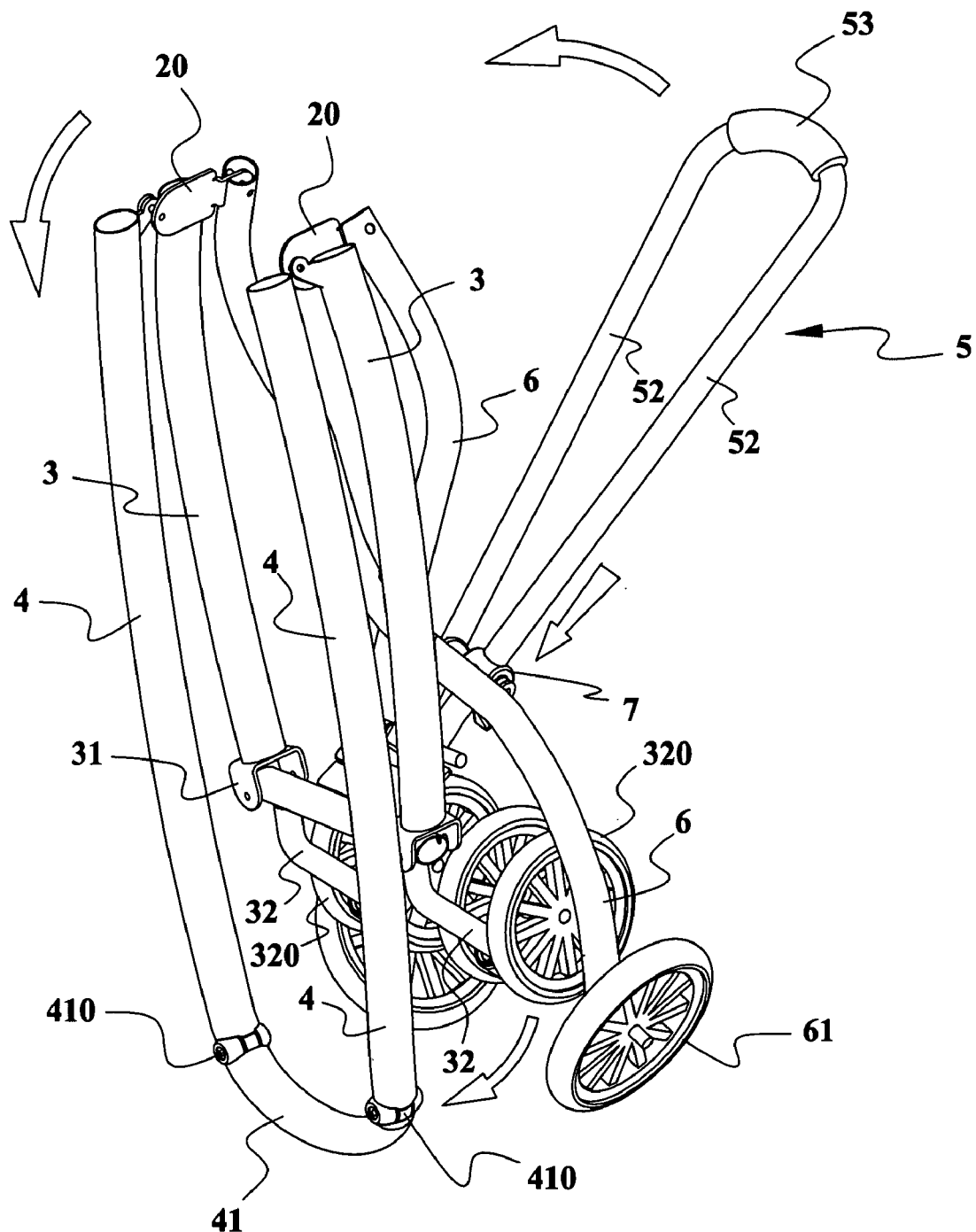
FIG. 4 is a schematic view showing the operation of folding the baby stroller frame from an erect state to a collapsed state.
Figure 5:
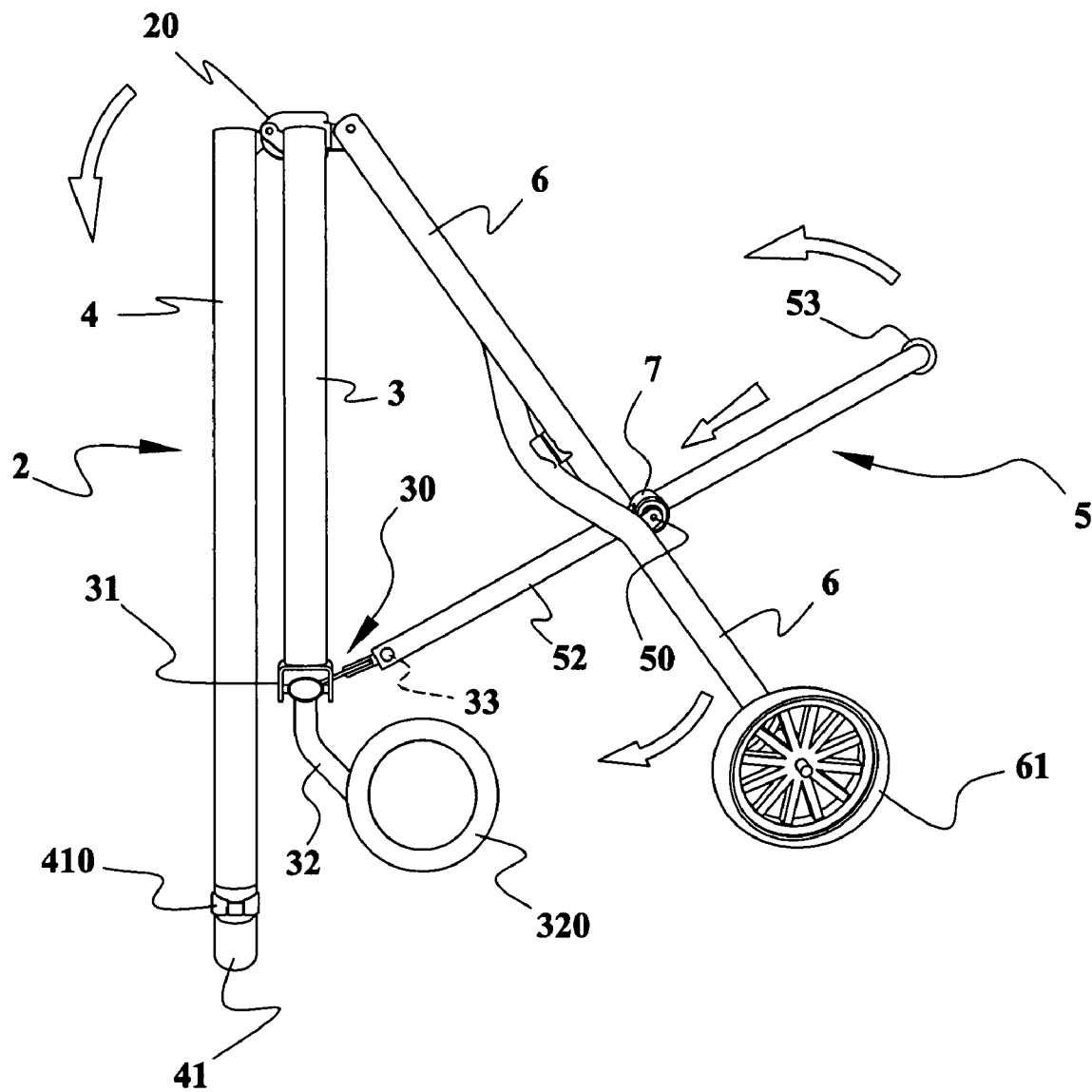
FIG. 5 is a side view showing the folding of operation the baby stroller frame from an erect state to a collapsed state.
Figure 6:
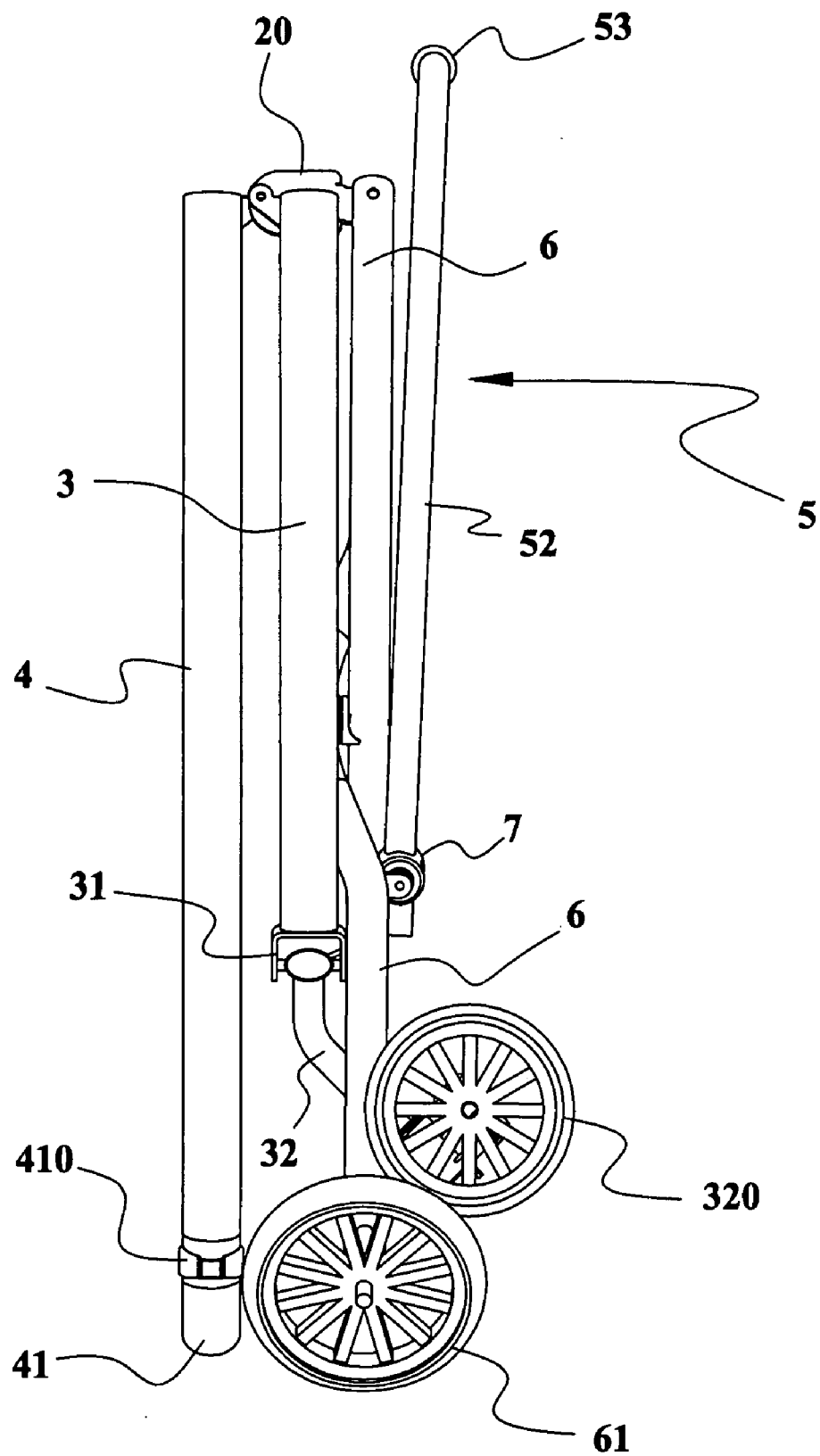
FIG. 6 is a side view showing the baby stroller frame being folded in a collapsed state.

The rear end of guiding frame 5 may connected with a grip 53 to facilitate the operation by a user. Referring to FIGS. 4, 5 and 6, when the guiding frame 5 is rotated, the sliding sleeve 7 slides along the connecting arms 52 to ward the connecting member 30 and carries the pair of rear leg tubes 6 close to each other and the front leg tubes 3, as shown in FIG 6.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A baby stroller frame, comprising:

a front frame connected with a front wheel;

a pair of rear leg tube, each having an upper end pivotally connected with the front frame, a lower end connected a rear wheel, and a joint connected with a sliding sleeve; and a guiding frame having a front end pivotally connected to the front frame, and a pair of connecting arms slidably connected with the sliding sleeve, wherein the front frame has a pair of front leg tube and a connecting member, the connecting member including:

a support arm, for pivotally connecting with the front wheel;

a pair of side joints, for pivotally connecting with the pair of front leg tube; and a rear end joint, for pivotally connecting with the front end of the guiding frame.

2. The baby stroller frame of claim 1, wherein the front frame has a handle, a pair of push arms, and a pair of front leg tubes, which are pivotally connected.

3. The baby stroller frame of claim 2, wherein the pair of push arms each has an upper end joint pivotally connected with the handle, and a lower end joint pivotally connected with the front leg tube.

4. The baby stroller frame of claim 3, wherein the lower end joint is pivotally connected between the front leg tubes, the rear leg tubes, and the push arms.

5. The baby stroller frame of claim 1, wherein the guiding frame has a rear end that is wider than the front end thereof.

6. The baby stroller frame of claim 1, wherein the guiding frame has a grip connected at the rear end thereof.

7. The baby stroller frame of claim 1, wherein the guiding frame guides the pair of sliding sleeves to slide along the pair of connecting arms, so as to carry the pair of rear leg tubes to close to the front frame.

* * * * *